United States Patent

Yamaguchi et al.

[11] Patent Number: 5,433,257
[45] Date of Patent: Jul. 18, 1995

[54] HEAVY DUTY PNEUMATIC RADIAL TIRES WITH SPECIFIED CARCASS TURNUP ARRANGEMENT

[75] Inventors: Hiroshi Yamaguchi, Saitama; Shigehito Kishinami, Tokyo; Hiroshi Ueda, Tokyo; Fumio Bamba, Tokyo, all of Japan

[73] Assignee: Bridgestone Corporation, Tokyo, Japan

[21] Appl. No.: 737,879

[22] Filed: Jul. 30, 1991

Related U.S. Application Data

[60] Division of Ser. No. 494,863, Mar. 14, 1990, Pat. No. 5,056,575, which is a continuation of Ser. No. 260,091, Oct. 19, 1988, abandoned.

[30] Foreign Application Priority Data

Oct. 24, 1987 [JP] Japan .................. 62-267623
Nov. 6, 1987 [JP] Japan .................. 62-281752

[51] Int. Cl.⁶ .................. B60C 9/08; B60C 15/00; B60C 15/06
[52] U.S. Cl. .................. 152/454; 152/539; 152/541; 152/543; 152/546; 152/552; 152/554

[58] Field of Search .................. 152/539, 541, 542, 543, 152/546, 552, 554, 454

[56] References Cited

U.S. PATENT DOCUMENTS

| | | | |
|---|---|---|---|
| 3,709,276 | 1/1973 | Montague | 152/554 |
| 3,921,693 | 11/1975 | Suzuki et al. | 152/541 |
| 4,705,091 | 11/1987 | Iuchi | 152/541 |
| 5,056,575 | 10/1991 | Yamaguchi et al. | 152/541 |

FOREIGN PATENT DOCUMENTS

| | | | |
|---|---|---|---|
| 0317814 | 12/1989 | Japan | 152/539 |
| 2267012 | 10/1990 | Japan | 152/539 |

*Primary Examiner*—Adrienne C. Johnstone
*Attorney, Agent, or Firm*—Sughrue, Mion, Zinn, Macpeak & Seas

[57] ABSTRACT

The bead durability of the heavy duty pneumatic radial tire for truck and bus is improved by arranging a rubber stock composed of three rubbers A, B and C each having particular properties between a carcass ply and its turnup portion in the bead portion and/or rendering the turnup portion of the carcass ply in the bead portion into a particular arrangement.

6 Claims, 7 Drawing Sheets

FIG_2

FIG_4
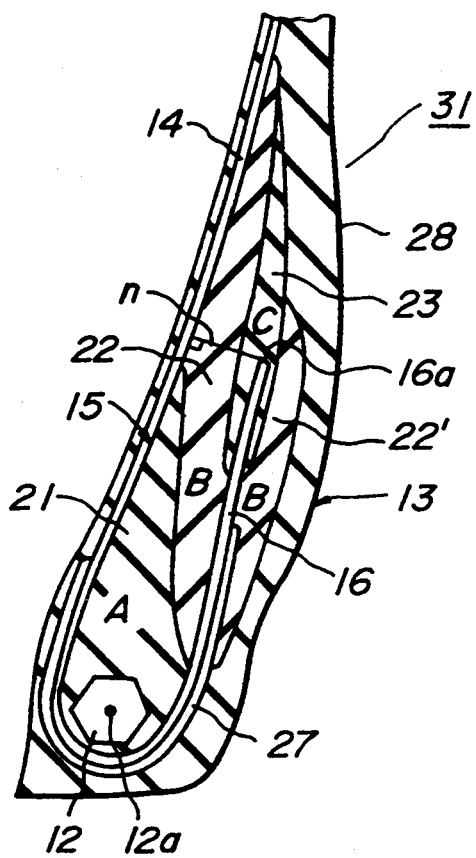
FIG_5
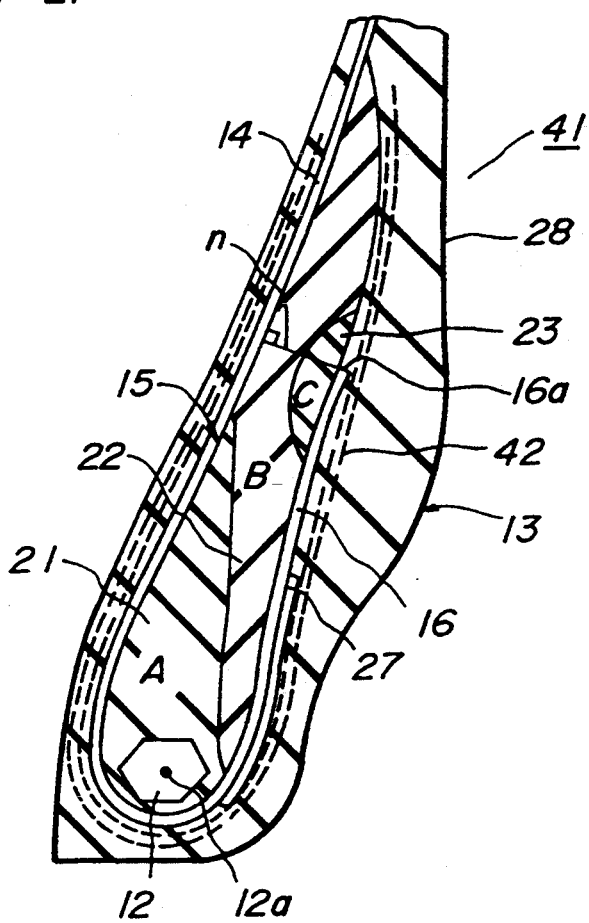

FIG_8
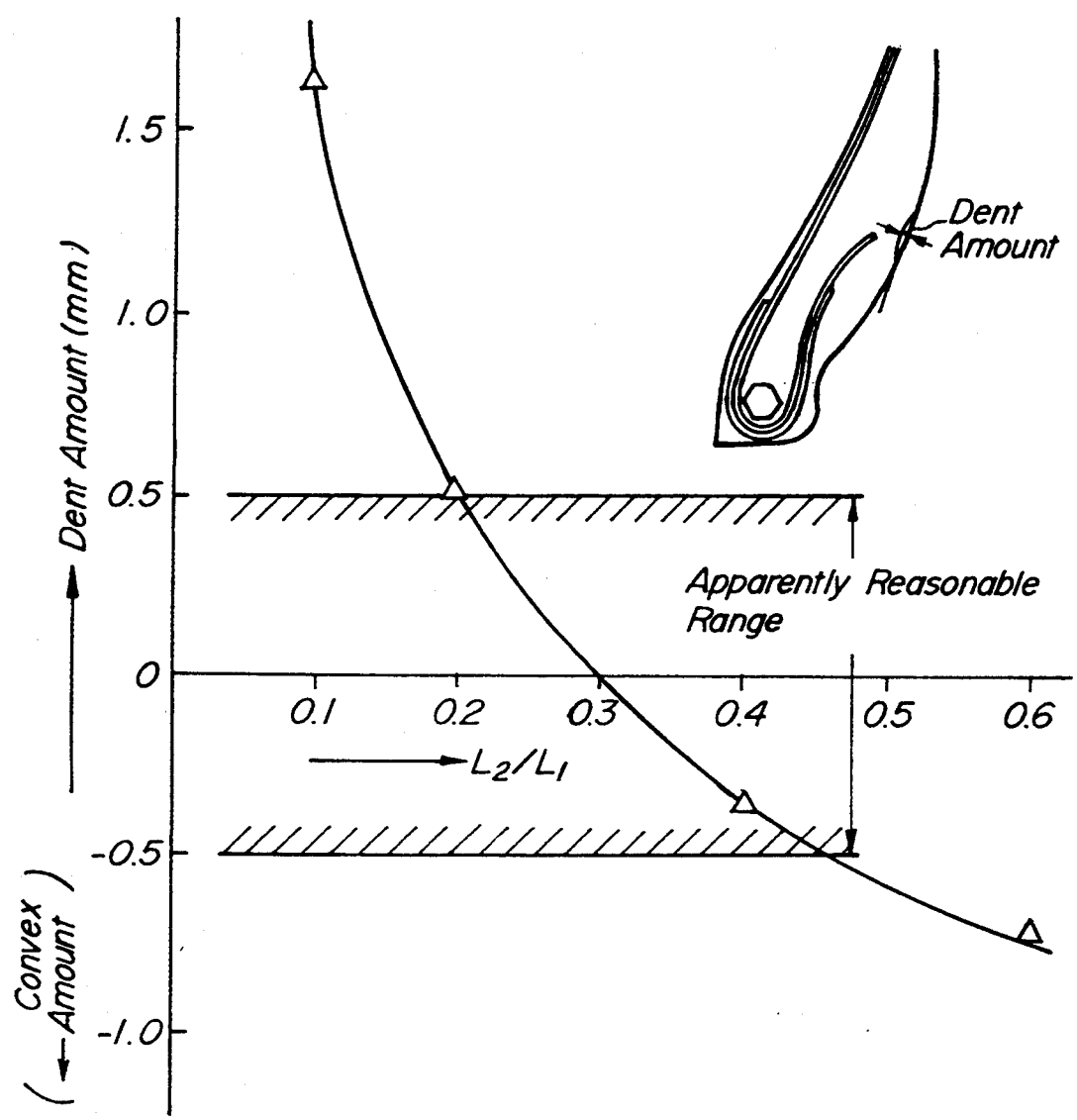

HEAVY DUTY PNEUMATIC RADIAL TIRES WITH SPECIFIED CARCASS TURNUP ARRANGEMENT

This is a divisional of application Ser. No. 07/494,863 filed Mar. 14, 1990, now U.S. Pat. No. 5,056,575, which is a continuation of application Ser. No. 07/260,091 filed Oct. 19, 1988 now abandoned.

BACKGROUND OF THE INVENTION

1. Field of the Invention

This invention relates to a heavy duty pneumatic radial tire for truck and bus, and more particularly to an improvement of the durability in the bead portion of the heavy duty pneumatic radial tire continuously running at a high speed under a heavy load over a long distance.

2. Related Art Statement

In general, when the heavy duty pneumatic radial tire mounted onto a truck, bus or the like is continuously run at a high speed under a heavy load over a long distance, bead failure occurs. This bead failure produces a crack between the turnup end portion of the carcass ply and the surrounding rubber, which then grows to cause separation failure.

When steel cords are used in the carcass ply of the heavy duty pneumatic radial tire, cracking at the turnup end portion of the carcass ply is caused by the stress concentration at the turnup end portion due to the deformation of the bead portion during the running under a heavy load, and the decrease of adhesion force between steel cord and rubber due to the rise of rubber temperature at the turnup end portion.

Heretofore, a bead portion of the tire as shown in FIG. 1 has been proposed in order to simultaneously establish the suppression of the deformation of the bead portion and the reduction of heat build-up at the turnup end portion of the carcass ply. In FIG. 1, numeral 1 is a heavy duty pneumatic radial tire for use in truck, bus or the like. The tire 1 comprises a bead portion 3 having each of bead cores 2, and a carcass 5 composed of a main carcass body 5a containing rubberized steel wire cords, which are extended between the bead cores 2 substantially in a radial plane of the tire and wound around the bead core 2 from the inside to the outside to form a turnup portion 5b. Between the main carcass body 5a and the turnup portion 5b of the carcass 5 are arranged a rubber stock $A_0$, 6 with a triangular section having a high elasticity of modulus and contacting with the bead core 2 for suppressing the falling-down deformation S of the bead portion 3 under a heavy load, and a rubber stock $B_0$, 7 having a low internal loss and extending outward in the radial direction outside the axial direction of the rubber stock $A_0$ for suppressing the heat build-up of the bead portion 3. The rubber stocks $A_0$ and $B_0$ form a stiffener 8. Numeral 9 is a chafer, and numeral 10 is a sidewall.

As mentioned above, in the conventional technique, the falling-down deformation of the bead portion 3 is suppressed and the heat build-up in the vicinity of the turnup end portion 5c is reduced by dividing the stiffener 8 into two layers.

In the recent heavy duty pneumatic radial tires, however, the tire life is largely increased with the improvement of the wear resistance and the increase of the retreading number, and consequently the number of repetitive deformation at the bead portion 3 under a heavy loading largely increases. Further, since the change of structure and shape in the tire is made for reducing the weight of the tire and the production cost, the rigidity of the bead portion lowers to make the falling-down deformation S of the bead portion large, and the strain in the vicinity of the turnup end portion 5c of the carcass ply 5 increases. As these results, a small crack is produced at the turnup end portion 5c and gradually grows inward in the bead portion to finally produce a large crack failure 4 as shown in FIG. 1.

In this connection, Japanese Patent Application Publication No. 54-564 discloses that the turnup portion of the carcass ply is bent so as to be made long with respect to the minimum distance between the turnup end and the bead core, whereby the separation failure between the turnup end and the rubber is prevented and the bead durability is improved. In this article, there is discussed the arrangement of the carcass turnup portion when particularly using a light carcass made from an organic fiber such as polyamide or the like as a carcass ply cord.

On the other hand, when the turnup end of the carcass ply is separated away from the carcass ply itself as far as possible, the amount of rubber stock interposed between the carcass ply and its turnup portion can be made large to reduce the stress concentration in the turnup end. In this case, however, when steel wire having a high rigidity is used as a ply cord, there is caused a problem inherent in the steel.

In general, when the tire is inflated under an internal pressure, the bead portion is elongated as a whole, during which the difference of the rigidity is produced between the upper part and lower part of the bead portion at the boundary of the rigid turnup portion, and consequently the elongating of the surface rubber layer in the bead portion becomes large above the turnup end portion rather than beneath thereof and the surface rubber layer is apt to be dented. As the tire runs on road under a loading, the turnup portion of the carcass ply is gradually put inward in the radial direction of the tire and also the surface rubber layer near to the turnup end is followed thereto, so that the fatigue failure is finally produced in the above dent through repetitive deformation. As a result, not only cracks are produced from the dent, but also the separation failure is caused in the end portion of the turnup due to the elongating. Thus, the durability of bead portion in this type of the tire is degraded by the synergistic action of these failures.

SUMMARY OF THE INVENTION

It is, therefore, an object of the invention to provide a heavy duty pneumatic radial tire which can suppress the falling-down of the bead portion to reduce strain and also can suppress the crack growth of rubber in the vicinity of the turnup end portion of the carcass ply to minimize the increase of tire weight and production cost and largely improve the durability of the bead portion by arranging three kinds of rubber having particular properties between the carcass ply and its turnup portion and in adjacent to the turnup portion and rendering a thickness of rubber adjacent to the turnup portion into a particular value.

It is another object of the invention to eliminate the cause of degrading the durability of the bead portion in the heavy duty pneumatic radial tire due to the occurrence of cracks in the surface rubber layer of the bead portion by preventing the occurrence of depression as mentioned above.

According to a first aspect of the invention, there is the provision of a heavy duty pneumatic radial tire comprising a carcass composed of at least one carcass ply containing steel wire cords substantially arranged in a radial plane of the tire and wound around each of bead cores from inside of the tire toward outside thereof to form a turnup portion, characterized in that a rubber A is arranged between said carcass ply and its turnup portion and adjacent to said bead core, a rubber B is arranged between said carcass ply and its turnup portion and above said rubber A, a rubber C is arranged along said rubber B and adjacent to said turnup portion to form a rubber stock as a reinforcement of bead portion; said rubber A has a 100% modulus of not less than 60 kgf/cm², said rubber B has a 100% modulus of 15-35 kgf/cm² and a resilience of 65-85, and said rubber C has a 100% modulus of 35-60 kgf/cm² and a resilence of 50-65; a ratio of thickness b of said rubber C to thickness a of said rubber stock as measured along normal line n drawn from said carcass ply through an end of said turnup portion is within a range of 0.3-0.75.

According to a second aspect of the invention, there is the provision of a heavy duty pneumatic radial tire comprising a carcass composed of at least one carcass ply containing steel wire cords substantially arranged in a radial plane of the tire and wound around each of bead cores from inside of the tire toward outside thereof to form a turnup portion, characterized in that said turnup portion is comprised of a combination of (a) a feature that a turnup end portion going away and extending from said bead core through a reversing point of said turnup portion, which approaches to a pass line of said carcass once and separates away therefrom, is substantially linear between normal line n drawn from said pass line of said carcass through an end e of said turnup portion and a straight line $l_1$ phantomly drawn in parallel to said normal line n at a distance corresponding to 5% of tire section height therefrom toward said bead core and is inclined at an intersecting angle of 60°-80° with respect to said normal line, and (b) a feature than when a second straight line $l_2$ is phantomly drawn in parallel to said normal line n at the same distance as mentioned above in opposition to said straight line $l_1$ and intersections of these lines n, $l_1$ and $l_2$ with a standard outer surface of the tire are Pn, $Pl_1$ and $Pl_2$, a ratio of distance $L_2$ between said intersection Pn and an intersection Pa of said normal line n with a line segment $Pl_1$-$Pl_2$ to distance $L_1$ between said intersection Pn and said turnup end e is within a range of 0.20-0.50.

According to a third aspect of the invention, there is the provision of a heavy duty pneumatic radial tire comprising a carcass composed of at least one carcass ply containing steel wire cords substantially arranged in a radial plane of the tire and wound around each of bead cores from inside of the tire toward outside thereof to form a turnup portion, characterized in that said turnup portion is comprised of a combination of (a) a feature that a turnup end portion going away and extending from said bead core through a reversing point of said turnup portion, which approaches to a pass line of said carcass once and separates away therefrom, is substantially linear between normal line n drawn from said pass line of said carcass through an end e of said turnup portion and a straight line $l_1$ phantomly drawn in parallel to said normal line n at a distance corresponding to 5% of tire section height therefrom toward said bead core and is inclined at an intersecting angle of 60°-80° with respect to said normal line, and (b) a feature that when a second straight line $l_2$ is phantomly drawn in parallel to said normal line n at the same distance as mentioned above in opposition to said straight line $l_1$ and intersections of these lines n, $l_1$ and $l_2$ with a standard outer surface of the tire are Pn, $Pl_1$ and $Pl_2$, a ratio of distance $L_2$ between said intersection Pn and an intersection Pa of said normal line n with a line segment $Pl_1$-$Pl_2$ to distance $L_1$ between said intersection Pn and said turnup end e is within a range of 0.20-0.50; and that a rubber A is arranged between said carcass ply and its turnup portion and adjacent to said bead core, a rubber B is arranged between said carcass ply and its turnup portion and above said rubber A, a rubber C is arranged along said rubber B and adjacent to said turnup portion to form a rubber stock as a reinforcement of bead portion; said rubber A has a 100% modulus of not less than 60 kgf/cm², said rubber B has a 100% modulus of 15-35 kgf/cm² and a resilience of 65-85, and said rubber C has a 100% modulus of 35-60 kgf/cm² and a resilience of 50-65; a ratio of thickness b of said rubber C to thickness a of said rubber stock as measured along normal line n drawn from said carcass ply through an end of said turnup portion is within a range of 0.3-0.75.

BRIEF DESCRIPTION OF THE DRAWINGS

The invention will be described with reference to the accompanying drawings, wherein:

FIGS. 4 and 5 are partially sectional views of second and third embodiments of the heavy duty pneumatic radial tire according to the invention, respectively;

FIG. 8 is a graph showing a behavior of dent or convex portion produced on the outer surface of the bead portion.

DESCRIPTION OF THE PREFERRED EMBODIMENTS

The inventors have made various studies with respect to the course of crack occurrence at the end 5c of the turnup portion 5b, relation between the crack growth and the rubber properties of bead filler, balance of rigidity in various parts of the tire and the like.

Figure 1:
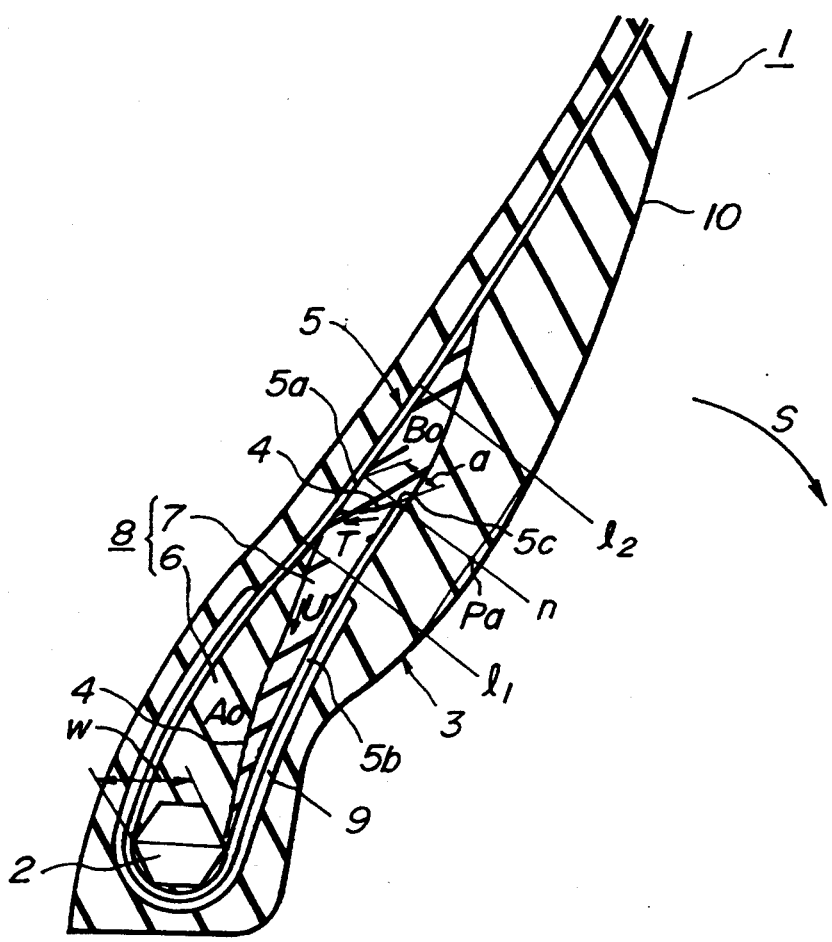
FIG. 1 is a partially sectional view of the conventional tire.

As a result, it has been confirmed that as shown in FIG. 1, cracks occur in the vicinity of the turnup end 5c and grow in the direction T directing to the carcass ply 5a inside the tire while dividing the rubber $B_0$ (7) into two parts to arrive at the carcass ply 5a or the rubber $A_0$ (6) and finally progresses in a direction U toward the bead core 2 along the boundary between rubbers $A_0$ and $B_0$. Particularly, in the course of crack growth, the crack produces inside the coating rubber for steel cords of the carcass 5 at the turnup end 5c and gradually grows therein. When the crack arrives at the rubber $B_0$, the crack growth becomes fast. This is due to the fact that the conventional rubber $B_0$ is composed of a rubber material having a low internal loss for reducing the heat build-up of the bead portion 3, which is poor in the resistance to crack growth as compared with the coating rubber for the carcass 5. In this connection, the inventors have found that the crack growth can be suppressed by separating the rubber $B_0$ away from the end 5c of the turnup portion.

On the other hand, the bead portion 3 becomes thin with the reduction of tire weight, and consequently the temperature rise advantageously tends to become small. However, the rigidity of the bead portion 3 as a whole lowers to relatively increase the falling-down of the bead portion 3, so that the strain of the surrounding rubber near to the end 5c of the turnup portion increases to lower the resistance to crack growth. Therefore, it has been found that in order to improve the bead durability, it is necessary to reduce the strain of rubber surrounding the turnup end 5c and improve the resistance to crack growth without recourse to reduce the heat build-up.

Considering the above-facts, the inventors have made various studies and found the heavy duty pneumatic radial tire according to the first aspect of the invention as mentioned above. That is, the rubber stock composed of three rubbers A, B and C each having particular properties is arranged between the carcass ply and its turnup portion and the ratio of thickness b of rubber C to thickness a of rubber stock is within a range of 0.3–0.75.

The term "100% modulus" used herein means a modulus of elasticity at 100% elongation of a given rubber sample under the given conditions according to a method of JIS K6301. Further, the term "resilience" used herein means an index value of rebound resilience measured at room temperature by means of a Dunlop tripsometer made by Toyo Seiki Kabushiki Kaisha. The larger the index value, the smaller the internal loss at impact, which is called as a so-called low internal loss, while the smaller the index value, the larger the internal loss, which is called as a so-called high internal loss.

Figure 2:
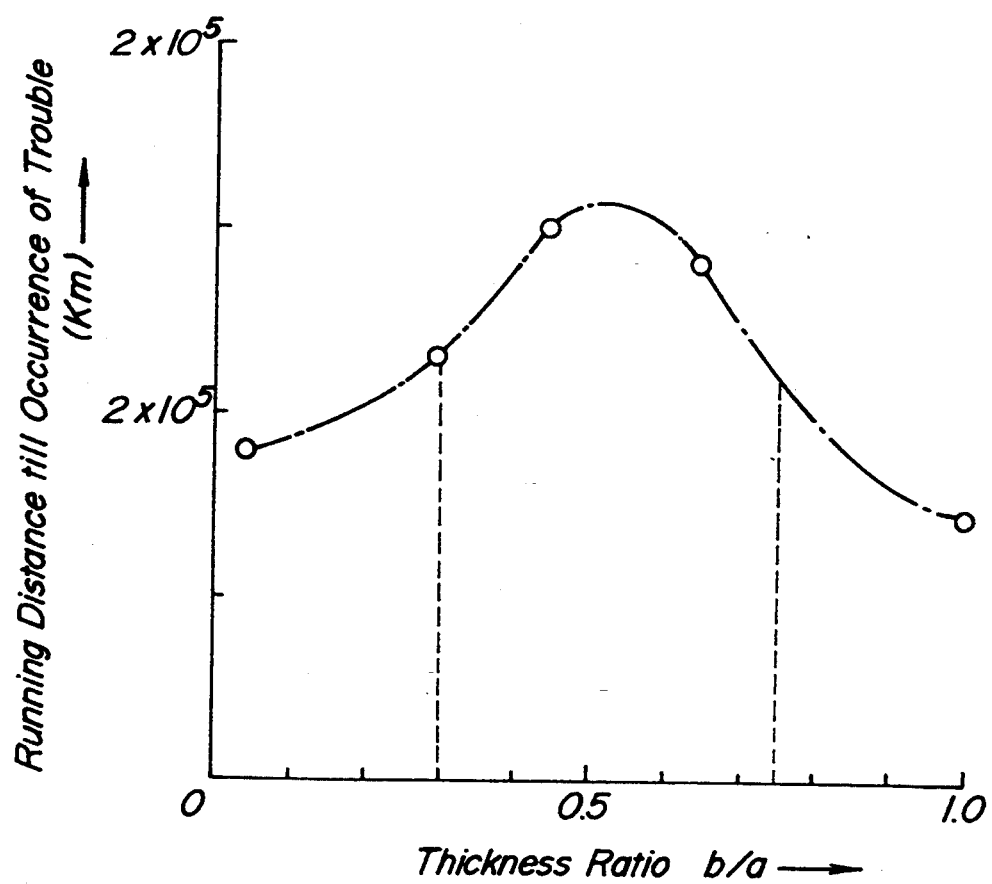
FIG. 2 is a graph showing test results of bead durability.
Figure 3:
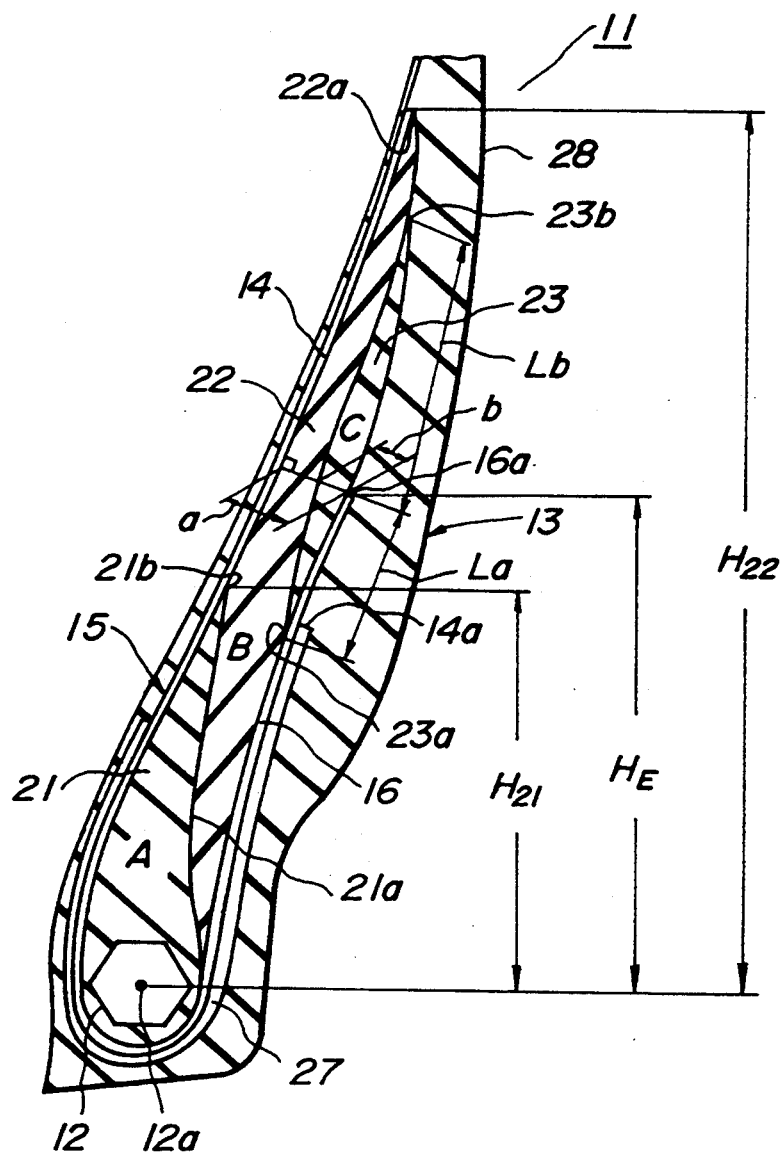
FIG. 3 is a partially sectional view of a first embodiment of the heavy duty pneumatic radial tire according to the invention.

In the heavy duty pneumatic radial tire according to the invention, the ratio of thickness b of rubber C to thickness a of rubber stock as measured along normal line n drawn from the carcass ply through the turnup end thereof is within a range of 0.3–0.75, preferably 0.4–0.65. When the thickness ratio b/a is less than 0.3, the effect of the invention is insufficient, while when it exceeds 0.75, the temperature of the bead portion rises to degrade the bead durability. FIG. 2 shows test results on the bead durability of the heavy duty pneumatic radial tire when varying the thickness ratio b/a, in which the test tire is the same as shown in FIG. 3. In FIG. 2, a running distance (km) till the occurrence of troubles is shown when the tire is run at a speed of 60 km/h under an internal pressure of 7.25 kg/cm$^2$ and a load of 5,700 kg. As seen from FIG. 2, the thickness ratio is desirable to be within a range of 0.3–0.75.

In the rubber stock according to the invention, the rubber A is necessary to have a 100% modulus of not less than 60 kgf/cm$^2$. When the 100% modulus is less than 60 kgf/cm$^2$, the outward falling deformation of the bead portion under loading becomes too large and the strain of rubber surrounding the turnup end portion of the carcass increases.

Further, the rubber B is necessary to have a 100% modulus of 15–35 kgf/cm$^2$. When the 100% modulus is less than 15 kgf/cm$^2$ or more than 35 kgf/cm$^2$, the balance of rigidity in the bead portion is degraded to increase the strain of rubber surrounding the turnup end portion of the carcass. On the other hand, the reason why the resilience of the rubber B is limited to a range of 65–85 is due to the fact that when the resilience is less than 65, the effect of reducing the heat build-up of the bead portion is not developed, while when it exceeds 85, the resistance to crack growth extremely lowers.

Moreover, the rubber C is necessary to have a 100% modulus of 35–60 kgf/cm$^2$. When the 100% modulus is less than 35 kgf/cm$^2$, the effect of suppressing strain at the turnup end portion is lost, while when it exceeds 60 kgf/cm$^2$, the resistance to crack growth at the same strain lowers. On the other hand, the reason why the resilience of the rubber C is limited to a range of 50–65 is due to the fact that when the resilience is less than 50, the disadvantage through the temperature rise of the turnup end portion is caused, while when it exceeds 65, the effect of suppressing the crack growth at the turnup end portion can not be developed due to the lowering of the resistance to crack growth. Therefore, the rubber C is high in the modulus of elasticity and internal loss as compared with the rubber B.

As mentioned above, in the heavy duty pneumatic radial tire according to the first aspect of the invention, the rubber C having high modulus of elasticity and internal loss is arranged at a given thickness between the carcass ply and its turnup portion in the vicinity of the turnup end to separate away the rubber B having a relatively poor resistance to crack growth from the turnup end portion, so that even when cracks are produced in the vicinity of the turnup end portion, the crack growth is largely suppressed. On the other hand, the rubber A having a high modulus of elasticity is arranged adjacent to the carcass ply and the bead core, and also the rubber B having a low internal loss is arranged adjacent to the carcass ply and its turnup portion, so that the falling-down of the bead portion is suppressed and the occurrence of strain near to the turnup end portion is largely reduced to suppress the heat build-up. Thus, the occurrence and growth of cracks are considerably reduced.

Then, the heavy duty pneumatic radial tire according to the second aspect of the invention will be described with reference to FIG. 6, wherein numeral 51 is a carcass body, numeral 52 a chafer, numeral 53 a turnup portion and numeral 54 a bead core.

The carcass body 51 is composed of at least one carcass ply containing steel wire cords arranged in the radial plane of the tire and wound around the bead core 54 from inside of the tire toward outside thereof to form the turnup portion 53 as a reinforcement for the bead portion together with the chafer 52.

According to the invention, the turnup portion 53 goes away from the bead core 54 together with the chafer 52 and extends over the end of the chafer 52. In this case, the turnup portion 53 passes through the reversing point approaching to the pass line of the carcass body 51 once and separating away therefrom. Furthermore, the turnup end portion is substantially linear between normal line n drawn from the pass line of the carcass body 51 through an end e of the turnup portion and a straight line $l_1$ phantomly drawn in parallel to the normal line n at a distance corresponding to 5% of tire section height therefrom toward the bead core. Normal line n is inclined at an intersecting angle $\theta$ of 60°–80° with respect to the pass line of the turnup portion 53.

The term "tire section height" used herein means a maximum distance of the pass line of the carcass body 51 as measured from bead base line in accordance with accepted practice.

In such a bead portion, when a second straight line $l_2$ is phantomly drawn in parallel to the normal line n at the same distance as mentioned above in opposition to the first straight line $l_1$ and intersections of these lines n, $l_1$ and $l_2$ with a standard outer surface of the tire are Pn, Pl$_1$ and Pl$_2$, a ratio of distance $L_2$ between the intersection Pn and an intersection Pa of the normal line n with a line segment Pl$_1$–Pl$_2$ to distance $L_1$ between the intersection Pn and the turnup end e is restricted to be within a range of 0.20–0.50.

In the heavy duty pneumatic radial tire according to the third aspect of the invention, the definition of the rubber stock described in the first aspect of the invention is applied to the tire according to the second aspect of the invention. That is, the same rubber stock comprised of three rubbers A, B and C as in the first aspect of the invention is arranged between the carcass body and its turnup portion in the tire according to the second aspect of the invention.

In general, it has been confirmed from the finite element method of the conventional tire shown in FIG. 1 that primary strain is repeatedly produced at the turnup portion 2 of the carcass ply 1, particularly the turnup end e during the running under a heavy load in an approximately radial direction of the tire.

As previously mentioned, the occurrence of primary strain comes into problem when the steel wire cord is used in the carcass ply different from the case described in Japanese Patent Application Publication No. 54-564 using the organic fiber cords in the carcass ply.

The inventors have analyzed the relation between ply direction at the turnup end of the carcass ply containing steel wire cords and the strain with several tire models and found that the turnup end portion is extended from the reversing point at an intersecting angle $\theta$ of 60°–80°, preferably 65°–75° with respect to the normal line n for reducing the occurrence of strain.

When the intersecting angle $\theta$ is larger than 80°, the effect of reducing the strain is insufficient and hence the improvement of bead durability is not so developed, while when it is smaller than 60°, the thickness of the outer rubber layer ranging from the turnup end e to the outer surface of the bead portion becomes thinner and there is a fear of causing the occurrence of a crack.

Figure 6:
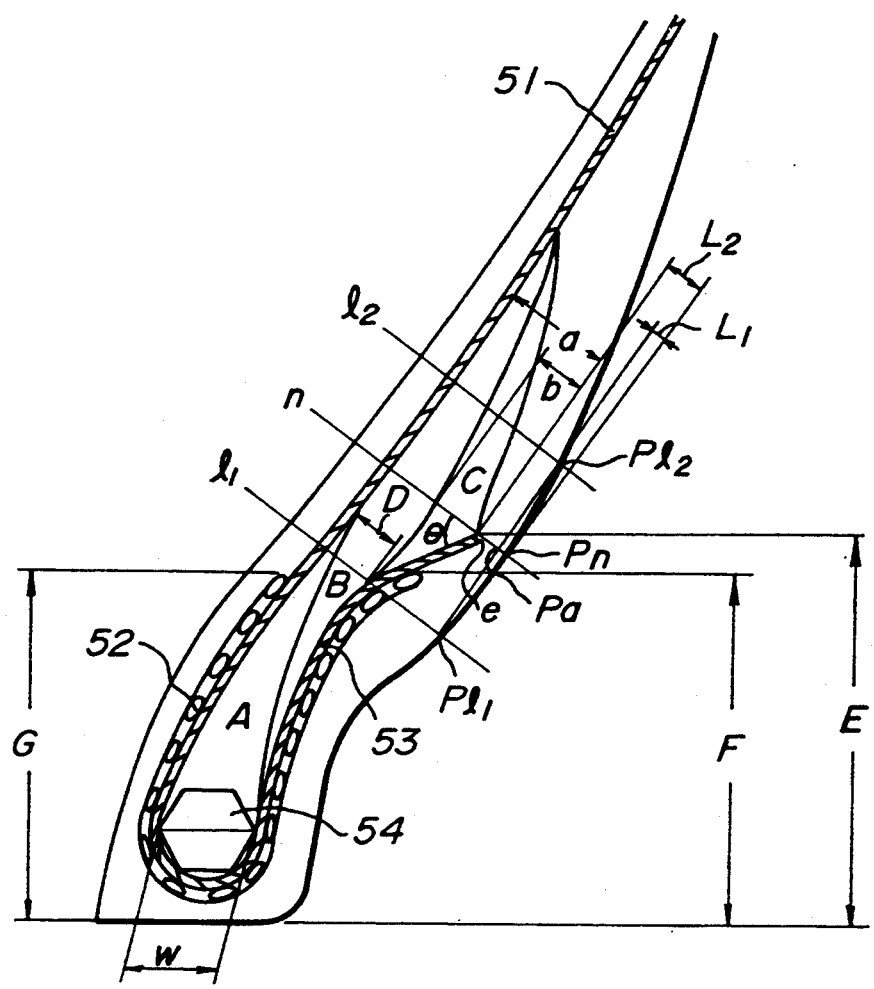
FIG. 6 is a partially sectional view of a fourth embodiment of the heavy duty pneumatic radial tire according to the invention.

When the end of the turnup portion 53 is separated away from the carcass body 51, it is necessary that a distance between the carcass body 51 and its turnup end e in the direction of normal line, i.e. the thickness a of the rubber stock shown in FIG. 6 is made at least wider than the maximum width w of the bead core 54. On the other hand, it is desirable to make the bead portion slim as far as possible from viewpoints of the reduction of tire weight and the suppression of heat build-up in the bead portion, so that the distance from the carcass body 51 to the outer surface of the tire can not be made thick. On the contrary, in the conventional tire, the distance a may be made narrower than the maximum width w of the bead core as shown in FIG. 1, so that a fairly thick outer rubber layer can be used outside the turnup end e.

For example, in the conventional bead structure of the heavy duty pneumatic radial tire having a tire size of 1000 R20 as shown in FIG. 1, the rubber layer outside the turnup end e has a thickness of about 8–12 mm, while according to the invention, the thickness of the rubber layer is reduced to about 4–6 mm. Therefore, the occurrence of dent and the degradation of bead durability through cracks accompanied therewith are caused by the aforementioned simple reversing arrangement of the turnup portion. In order to advantageously overcome this problem, it is necessary to restrict the ratio $L_2/L_1$ shown in FIG. 6 to a range of 0.2–0.5.

Figure 7:
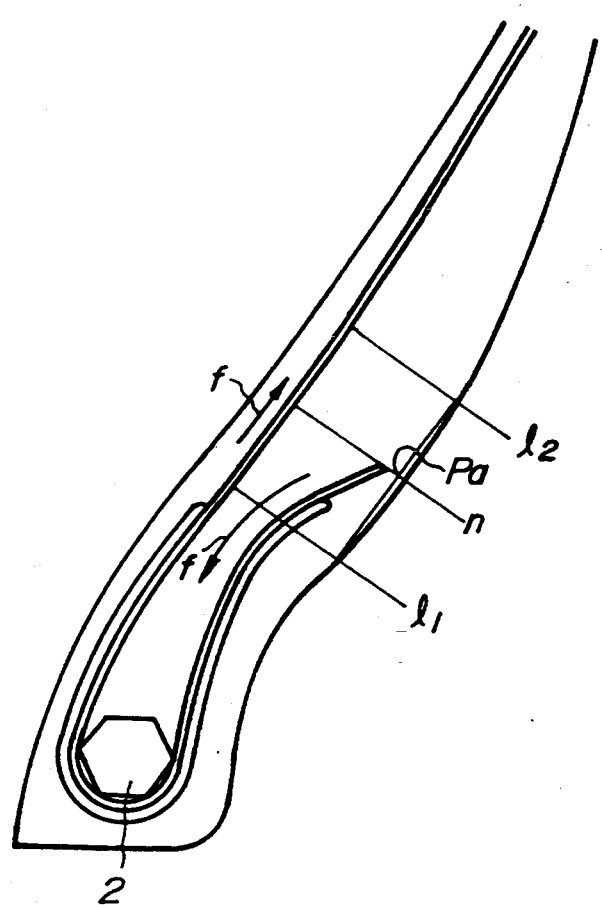
FIG. 7 is a sectional view of a main part of a comparative tire.

That is, the dent produced near to the intersecting point Pa in the bead portion as shown in FIG. 1 is usually not more than 0.5 mm, while in a comparative example shown in FIG. 7, the dent may be produced to extend from 0.5 mm to 2.0 mm. In the invention, it is particularly intended to avoid the disadvantage of producing the dent by previously rendering a portion forming the dent during the molding in a mold into a convex portion. FIG. 8 shows an experimental relation between value of $L_2$ and dent amount when $L_1$ is 5.0 mm in the tire according to the invention wherein the turnup end portion is separated away from the carcass body 51. In this case, the appearance is favorable when the dent amount is within a range of 0.5 mm to −0.5 mm, from which the ratio $L_2/L_1$ is said to be proper within a range of 0.2–0.5. When the ratio $L_2/L_1$ is less than 0.2, the occurrence of dent can not be prevented, while when it exceeds 0.5, the portion apparently forming the dent is unfavorably rendered into convex portion.

The following examples are given in illustration of the invention and are not intended as limitations thereof.

EXAMPLE 1

FIG. 3 shows a first embodiment of the heavy duty pneumatic radial tire according to the invention.

In FIG. 3, numeral 11 is a heavy duty pneumatic radial tire having a tire size of 10.00 R20. This tire 11 comprises a pair of bead portions 13 each having a ring-like bead core 12 in its base part, and a carcass 15 composed of one carcass ply 14 containing rubberized steel wire cords each extending between the bead cores 12 and substantially arranged in the radial plane of the tire. The carcass ply 14 is wound at each of both ends 14a around the bead core 12 from inside of the tire toward outside thereof to form a turnup portion 16.

Furthermore, a rubber stock is arranged between the carcass ply 14 and its turnup portion 16, which consists of a rubber A (21) with a triangular form in section adjacent to the carcass ply 14 and the bead core 12, a rubber B (22) with approximately a square form in section adjacent to the outer surface 21a of the rubber A, the carcass ply 14 and the turnup portion 16, and a rubber C (23) adjacent to the rubber B and the turnup-portion 16 and covering an end 16a of the turnup portion 16.

The rubber A is a high modulus rubber having a 100% modulus of not less than 60 kgf/cm$^2$, and the rubber B is a low modulus, small internal loss and low heat build-up rubber having a 100% modulus of 15–35 kgf/cm$^2$ and a resistance of 65–85, and the rubber C is a high modulus and relatively low internal loss rubber having a 100% modulus of 35–60 kgf/cm$^2$ and a resilience of 50–65.

A height $H_E$ ranging from the end 16a of the turnup portion 16 to a center 12a of the bead core 12 is 70 mm, a height $H_{21}$ ranging from a radially outward end 21b of the rubber A to the center 12a of the bead core 12 is 60 mm, and a height $H_{22}$ ranging from a radially outward end 22a of the rubber B to the center 12a of the bead core 12 is 120 mm. Further, a thickness a of the rubber stock as measured along normal line n drawn from the carcass ply 14 through the end 16a of the turnup portion 16 is 9.0 mm and a thickness b of the rubber C is 4.5 mm, from which the ratio b/a is 0.50. Moreover, a distance La from the end 16a of the turnup portion 16 to a radially inward end 23a of the rubber C is 20 mm, and a distance from the end 16a of the turnup portion 16 to a radially outward end 23b of the rubber C is 28 mm.

Numeral 27 is a chafer and numeral 28 is a sidewall portion. The structure other than the above is the same as in the usual heavy duty pneumatic radial tire for truck and bus.

When the tire 11 is continuously run at a high speed under a heavy load, the bead portion is repeatedly subjected to deformation. In the tire 11, however, the rubber C having high modulus of elasticity and internal loss and good resistance to crack growth is arranged at a given thickness in the vicinity of the end 16a of the carcass turnup portion 16 to separate away the rubber B having a relatively poor resistance to crack growth from the end 16a of the turnup portion 16, so that even if cracks are caused near to the end 16a of the turnup portion 16, the crack growth is largely suppressed by the rubber C having a good resistance to crack growth.

On the other hand, the rubber A having a high modulus of elasticity and the rubber B having low internal loss and heat build-up are arranged in the bead portion 13, so that the falling-down of the bead portion 13 is suppressed and also the occurrence of strain near to the end 16a of the turnup portion 16 is reduced to suppress the heat build-up. Thus, the occurrence of a crack near to the end 16a of the turnup portion 16 is largely reduced and the growth of such a crack is hardly caused in the bead portion 13, whereby the bead durability is largely improved.

EXAMPLE 2

FIG. 4 shows a second embodiment of the heavy duty pneumatic radial tire according to the invention, which is a modified tire of FIG. 3.

In the first embodiment, the rubber C is arranged outside the rubber B between the rubber B and the turnup portion 16 in the vicinity of the turnup end 16a so as to extend outward in the radial direction. On the other hand, in the tire 31 of the second embodiment, the rubber C is arranged outside the rubber B between the rubber B and the turnup portion 16 and outside the turnup portion 16 so as to cover the end 16a of the turnup portion 16, while a part (22') of the rubber B is arranged outside the turnup portion 16 so as to cover a part of the rubber C and a part of the chafer 27. The structure other than the above is the same as in the first embodiment.

EXAMPLE 3

FIG. 5 shows a third embodiment of the heavy duty pneumatic radial tire according to the invention, which is another modified tire of FIG. 3.

The structure of the tire 41 in the third embodiment is the same as in the first embodiment of FIG. 3 except that the rubber C of arc form in section is arranged outside the rubber B only in the vicinity of the turnup end 16a between the rubber B and the turnup portion 16 and two reinforcing layers 42 each containing fiber cords are arranged so as to cover the carcass ply 15 and its turnup portion 16 and the chafer 27.

EXAMPLE 4

FIG. 6 shows a fourth embodiment of the heavy duty pneumatic radial tire according to the invention having a tire size of 10.00 R20.

The carcass body 51 is composed of one carcass ply containing metal cords, which is wound around the bead core 54 from inside toward outside to form the turnup portion 53. In this case, the turnup portion 53 is arranged so that it extends outward from a position adjoining to the bead core 54 in the radial direction so as to most approach to the carcass body 51 and then extends outward in the radial and axial directions so as to separate away from the carcass body 51 and most separates away from the carcass body 51 at the turnup end e.

In this embodiment, the distance between the carcass body 51 and its turnup portion 53 is set to be 10 mm at a most approaching position therebetween and 15 mm at the turnup end e. The intersecting angle $\theta$ of the turnup end portion with respect to the normal line is 70°, and the distance $L_1$ ranging from the turnup end e to the outer surface of the tire is 6 mm. Further, the maximum width w of the bead core 54 is 12 mm, and the tire section height is 268 mm, and the distance ($L_2$) between points Pa and Pn is 1.7 mm.

Moreover, a height E of the turnup portion is 70 mm, a height F of outer turnup portion of the chafer is 55 mm and a height G of inner turnup portion of the chafer is 38 mm. The inclination angle of cords in the carcass ply is 90° with respect to the circumferential direction, and the inclination angle of cords in the chafer is 30° with respect to the circumferential direction.

When a/D=1.2–1.7, it is desirable that E is 20–40% of the tire section height, F is 70–90% of E, and G is a range of 0–E, and the cord angle of the chafer is 25°–60° with respect to the circumferential direction.

EXAMPLE 5

As a fifth embodiment, a rubber stock consisting of the following three rubbers A, B and C is arranged between the carcass body 51 and its turnup portion 53 in the bead portion of the heavy duty pneumatic radial tire shown in FIG. 6. In this case, the rubber A has a 100% modulus of 65 kgf/cm$^2$, and the rubber B has a 100% modulus of 25 kgf/cm$^2$ and a resilience of 72, and the rubber C has a 100% modulus of 42 kgf/cm$^2$ and a resilience of 60.

The thickness a of the rubber stock at the turnup end e is 15.0 mm and the thickness b of the rubber C is 7.0 mm, from which the ratio b/a is 0.47. Further, the height up to the upper end of the rubber A is 60 mm, and the height up to the upper end of the rubber B is 120 mm, and the distance from the turnup end e to the lower end of the rubber C is 20 mm and the distance to the upper end of the rubber C is 28 mm.

As mentioned above, in the first aspect of the invention, the rubber stock consisting of three rubbers A, B and C each having particular properties is arranged between the carcass ply and its turnup portion and the thickness of the rubber C is limited to a given value, whereby the falling-down of the bead portion can be suppressed to reduce the strain and also the crack growth of rubber in the vicinity of the turnup end portion can be suppressed to largely improve the bead durability while minimizing the increase of tire weight and production cost. In the second aspect of the invention, the occurrence of dent on the outer surface of the tire near to the turnup end portion can be prevented to enhance the appearance of the tire and prevent the occurrence of separation failure at the turnup end, and also the reduction of tire weight and the improvement of bead durability can be achieved. In the third aspect of the invention, the occurrence and growth of cracks in rubber at the turnup end portion of the carcass ply can be suppressed during running under a heavy load to achieve the improvement of bead durability.

What is claimed is:

1. A heavy duty pneumatic radial tire comprising; a carcass composed of at least one carcass ply containing steel wire cords substantially arranged in a radial plane of the tire and wound around each of bead cores from inside of the tire toward outside thereof to form a turnup portion, said turnup portion is comprised of an end portion going away and extending from said bead core through a reversing point of said turnup portion, which approaches a pass line of said carcass once and separates away therefrom, is substantially linear between normal line n drawn from said pass line of said carcass normal to said carcass ply and through the end of said turnup portion and a straight line $l_1$ phantomly drawn in parallel to said normal line n at a distance corresponding to 5% of tire section height therefrom toward said bead core as measured along a distance perpendicular to normal line n and is inclined at an intersecting angle $\Theta$ of 60°–80° with respect to said normal line, a second straight line $l_2$ is phantomly drawn in parallel to said normal line n at the same distance as mentioned above in opposition to said straight line $l_1$ and intersections of said lines n, $l_1$ and $l_2$ with an outer surface of the tire are $P_n$, $Pl_1$ and $Pl_2$, a ratio of distance $L_2$ between said intersection $P_n$ and an intersection $P_a$ of said normal line n with a line segment $Pl_1$–$Pl_2$ to distance $L_1$ between said intersection $P_n$ and said turnup end is within a range of 0.20–0.50.

2. The tire of claim 1 further comprising chafer layers wound about said bead cores and positioned outside said carcass ply and said turn-up portion.

3. The tire of claim 1, wherein said intersecting angle $\Theta$ is in the range of 65°–75°.

4. The tire of claim 1 further comprising a multipart rubber stock arranged between said carcass ply and said turn-up portion and positioned above said bead core.

5. The tire of claim 4, wherein said multipart rubber stock comprises 3 rubber layers, a first rubber layer positioned above said bead core, second and third rubber layers successively positioned substantially between said carcass and said turn-up layer and wherein a ratio of thickness (b) of said third rubber layer to a thickness (a) of said rubber stock as measured along said normal line (n) is in the range of 0.3 to 0.75.

6. The tire of claim 5, wherein said ratio of thickness is in the range of 0.4 to 0.65.

* * * * *